(12) United States Patent
Huang et al.

(10) Patent No.: US 10,726,540 B2
(45) Date of Patent: Jul. 28, 2020

(54) SELF-SIMILARITY ANALYSIS FOR DEFECT DETECTION ON PATTERNED INDUSTRIAL OBJECTS

(71) Applicant: INTERNATIONAL BUSINESS MACHINES CORPORATION, Armonk, NY (US)

(72) Inventors: Jing Chang Huang, Shanghai (CN); Wei Sun, Beijing (CN); Jun Chi Yan, Shanghai (CN); Ren Jie Yao, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/785,904

(22) Filed: Oct. 17, 2017

(65) Prior Publication Data
US 2019/0114754 A1  Apr. 18, 2019

(51) Int. Cl.
*G06T 7/00* (2017.01)
*G06K 9/62* (2006.01)
*G01N 21/88* (2006.01)
*G09G 3/00* (2006.01)

(52) U.S. Cl.
CPC .......... *G06T 7/001* (2013.01); *G01N 21/8851* (2013.01); *G06K 9/6215* (2013.01); *G06T 7/0004* (2013.01); *G09G 3/006* (2013.01); *G01N 2021/8864* (2013.01); *G01N 2021/8887* (2013.01); *G01N 2021/8893* (2013.01)

(58) Field of Classification Search
None
See application file for complete search history.

(56) References Cited

U.S. PATENT DOCUMENTS

| | | | | |
|---|---|---|---|---|
| 7,826,675 B2 * | 11/2010 | Kisilev | ...................... | G06T 5/30 382/257 |
| 2016/0054233 A1 * | 2/2016 | Bense | ..................... | G01N 25/72 250/330 |
| 2019/0114754 A1 * | 4/2019 | Huang | .................... | G06T 7/001 |

FOREIGN PATENT DOCUMENTS

CN  105627942 A  6/2016

OTHER PUBLICATIONS

Asha et al., "Similarity Measures for Automatic Defect Detection on Patterned Textures", International Journal of Image Processing and Vision Sciences (IJIPVS) vol. 1 Issue 1, 2012, pp. 18-24.

Bai et al., "Saliency-Based Defect Detection in Industrial Images by Using Phase Spectrum", IEEE Transactions on Industrial Informatics, vol. 10, No. 4, Nov. 2014, pp. 2135-2145.

Grauman, "Sliding Window Detection", UT-Austin, Jan. 29, 2009, pp. 1-42.

(Continued)

*Primary Examiner* — Tahmina N Ansari
(74) *Attorney, Agent, or Firm* — Tihon Poltavets

(57) ABSTRACT

A method for object defect detection includes receiving digital data representing an image of an object with a repeated pattern. The method identifies a part of the image of the object as defined by a sample window of the digital data. The method generates one or more functions from at least the part of the image, wherein each of the one or more functions corresponds to one component of a pixel contained in the part of the image. Responsive to performing self-similarity analytics on the one or more functions, the method identifies a defect area of the object.

14 Claims, 6 Drawing Sheets

(56) References Cited

OTHER PUBLICATIONS

"Selective Search for Object Localisation", Homepage of Jasper Uijlings, http://disi.unitn.it/~uijlings/MyHomepage/index.php#page=projects1, printed Oct. 17, 2017, pp. 1-12.

* cited by examiner

SELF-SIMILARITY ANALYSIS FOR DEFECT DETECTION ON PATTERNED INDUSTRIAL OBJECTS

FIELD OF THE INVENTION

The present invention relates to industrial object defect detection, and more specifically, to object defect detection by performing self-similarity analysis on functions generated based on the image of an object.

BACKGROUND

Defect detection of industrial objects has become a common demand nowadays. For example, car manufactures need to make sure there is no exterior defect on the cars before they are put into the market. Such demand also exists for microscopic objects, for example, the exterior defect detection for LED panels, smart phones and so on. Generally, there could be various types of defects that may occur on an object. For example, there could be more than 100 types of defects on a LED panel's surface.

A traditional way to detect the defects of objects is manual inspection, which means labors need to check each object using unaided eyes or magnifiers to identify the defects. However, this is quite a time-consuming work which needs certain amount of hired labors. Further, manual inspection is very slow and prone to be erroneous after long time work. There could be potentially 200 million volume of images that need manual inspections to be performed every day in a cell phone factory. Especially when the objects to be inspected are small or even tiny, it is almost unlikely for human beings to do the manual inspection. Thus, there is a need for automatic detection of defects for industrial objects to relieve human beings from the manual inspection to improve the efficiency and reduce errors and cost.

SUMMARY

One aspect of an embodiment of the present invention discloses a method for object defect detection, comprising: receiving, by one or more processors, digital data representing an image of an object with a repeated pattern; identifying, by one or more processors, a part of the image of the object as defined by a sample window of the digital data; generating, by one or more processors, one or more functions from at least the part of the image, wherein each of the one or more functions corresponds to one component of a pixel contained in the part of the image; responsive to performing self-similarity analytics on the one or more functions, identifying, by one or more processors, a defect area of the object.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1:
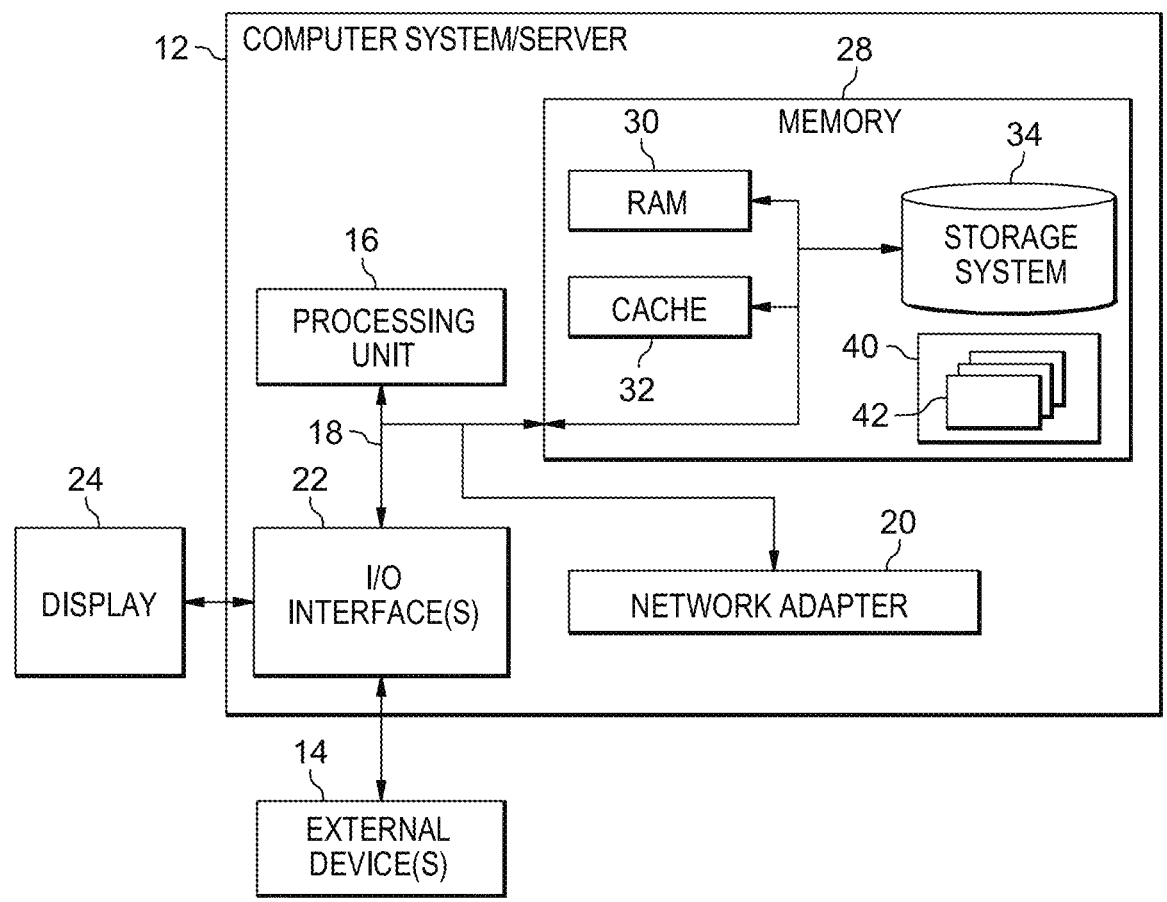
FIG. 1 shows an exemplary computer system which is applicable to implement the embodiments of the present invention.

Currently some solutions for automatic defect detection of industrial objects are available to reduce the manual labor inspection. A typical solution is based on image template. For an industrial object, an image template of the object may be created as reference. Then, photos of to-be-detected objects may be taken and may be compared with the pre-created template to identify the differences. False alarm is a major issue due to many types of noises during feature extraction from photos and comparison. Another issue could be slowness because in many cases the object may be in a cluttered scene and the sliding window is used to look for the target object which needs exhaustive search for each category/detector.

According to one embodiment of the present invention, there is provided a computer-implemented method for detecting defects of industrial objects. The method comprises obtaining an image of an object with periodically repeated pattern. The method further comprises determining at least a part of the image confined by a sample window. The method further comprises generating one or more functions from the part of the image. The method further comprises performing self-similarity analytics on the one or more functions to identify a defect area of the object.

According to another embodiment of the present invention, there is provided a system for object defect detection. The system comprises one or more processors, a memory coupled to at least one of the one or more processors and a set of computer program instructions stored in the memory and executed by at least one of the one or more processors in order to perform some actions. The actions comprise obtaining an image of an object with periodically repeated pattern. The actions further comprise determining at least a part of the image confined by a sample window. The actions further comprise generating one or more functions from the part of the image. The actions further comprise performing self-similarity analytics on the one or more functions to identify a defect area of the object.

According to another embodiment of the present invention, there is provided a computer program product for object defect detection, the computer program product comprising a computer readable storage medium having program instructions embodied therewith. And the program instructions are executable by a device to perform a method. The method comprises obtaining an image of an object with periodically repeated pattern. The method further comprises identifying at least a part of the image defined by a sample window. The method further comprises generating one or more functions from the part of the image. The method further comprises performing self-similarity analytics on the one or more functions to identify a defect area of the object.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In view of the shortcomings of manual inspection as mentioned in the Background and further weakness of some automation inspection process as mentioned in the Summary, there is a need for a speedy automatic solution for defect detection of objects. There is also a need for automatic solution for defect detection of objects with more accuracy to reduce false alarms.

Figure 2A:
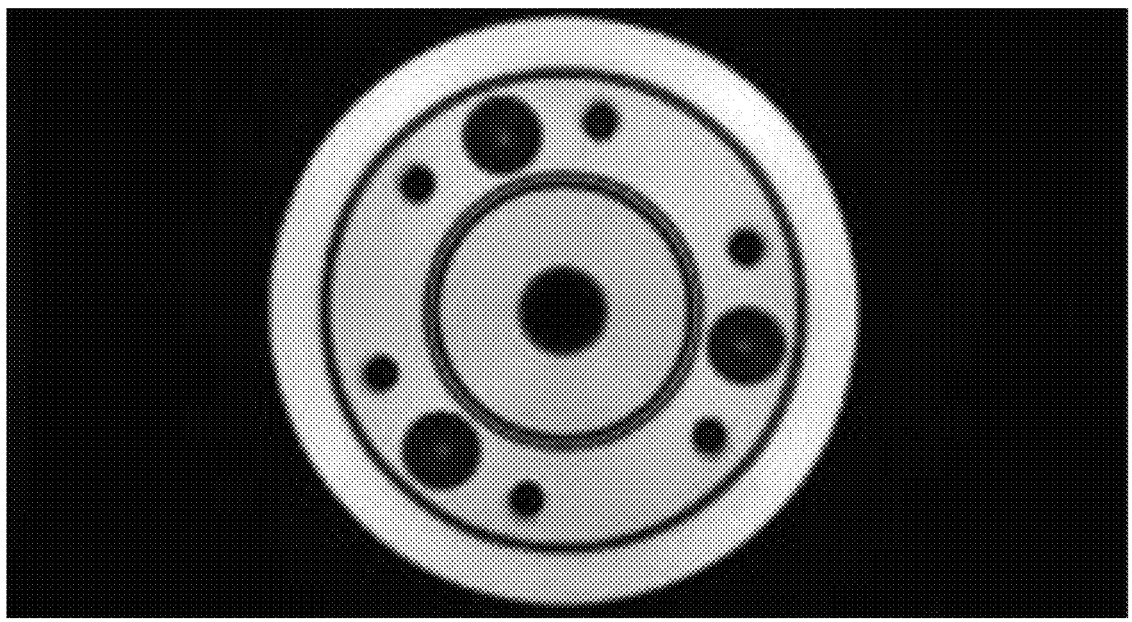
FIG. 2A shows an exemplary bearings in a circle shape.
Figure 2B:
FIG. 2B shows an image of the bearings with overt repeated appearances by unfolding the bearings of FIG. 2A along radius.

Now the main idea of the present invention will be introduced. It is found in the present invention that in industrial settings, many objects and images of objects exhibit repeated appearances and patterns, for example, LCD (liquid crystal display) screen, chipset, wafer and so on. Repeated appearances and patterns means periodical appearances or patterns. Even some industrial objects in circle shapes may also exhibit repeated appearances such as gear and bearings. FIG. 2A shows an exemplary bearings in a circle shape and FIG. 2B shows an image of the bearings with overt repeated appearances by unfolding the bearings of FIG. 2A along its radius. Based on this key observation, the present invention utilizes the repeated image pattern of objects to generate functions corresponding to different components extracted from the images' pixels such as the R(red), G(green) and B(blue) components. Since the original images of objects have repeated appearances, the generated functions therefrom also have the same repeated appearances and patterns. Then, the present invention performs self-similarity analysis on the functions using the feature of "repeated pattern" to identify where is the gap deviated from the repeated pattern, and therefore the defect of objects can be determined on the place where the gap is found. There is no need to prepare and use any templates to do the image comparison so the false alarm can be reduced and speed can be improved.

Figure 3:
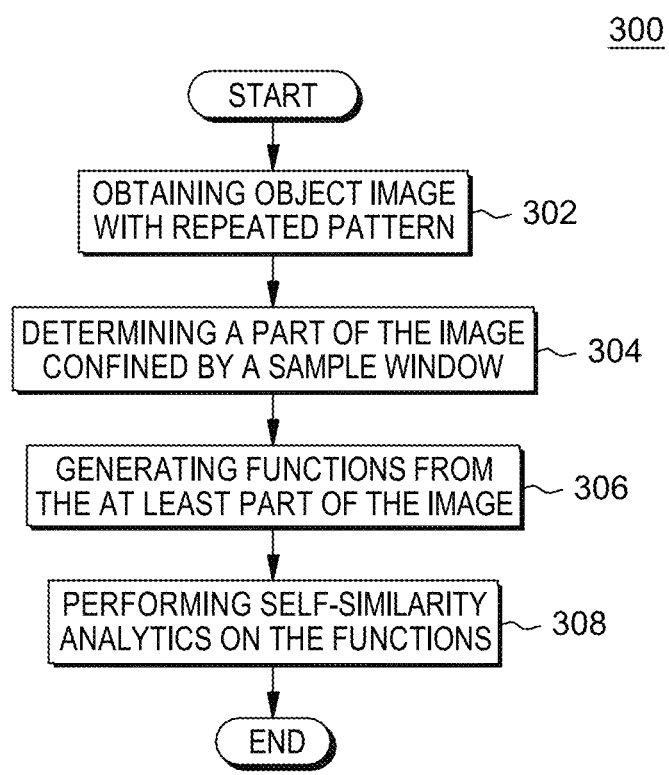
FIG. 3 shows an exemplary flow chart of the method which is applicable to implement the embodiments of the present invention.

With reference now to FIG. 3, an exemplary flow chart of the process 300 which is applicable to implement the embodiments of the present invention is provided. Starting from step 302, digital data representing an image of an object is received and the received image has a periodically repeated pattern. According to an embodiment of the present invention, the image of the object may be obtained by taking a photo on the object. According to another embodiment of the present invention, the image of the object may be obtained by further processing the photo on the object. For example, FIG. 2A may be an original photo taken on the bearings, and FIG. 2B is generated by further processing FIG. 2A by unfolding it along its radius. There is no restriction of the present invention on how the images of objects may be obtained and what exactly the periodically repeated pattern looks like.

Then the process 300 moves to step 304. In step 304, at least a part of the image is determined through a sample window of the digital data. Depending on the size and complexity of the image, sample window may be used to determine at least a part of the image for fine grain analysis. It should be understood that "at least a part" may mean part of the image or the whole image depending on the necessity of separating the image for analysis. It should also be understood that the term "sample window" is used to confine a part of the image, other than any "window" with any specific shape or pattern.

There may be different embodiments for determining at least a part of the image using a sample window. According to one embodiment under the present invention, an original sample window confining a part of the image is determined at the beginning. Then, the original sample window is extended to generate at least one other sample window. Due to the extension, every of the other sample windows may cover the original sample window. The original sample window and other sample windows extended from the original sample window each confines a part of the image respectively. By this way, all area of the image may be fully covered by sample windows because the sample windows are extended from the original sample window and all the extended sample windows cover the original sample window.

According to another embodiment under the present invention, an original sample window confining a part of the image is determined at the beginning as well. However, other sample windows are then generated based on pre-defined intervals and each of the other sample windows is not fully covering the original sample window, which means either each of the other sample windows has no overlapping area with the original sample window or it partly covers the original sample window. For example, the pre-defined interval is set to be 200 pixels in the vertical direction (along y axis). If the original sample window is from 0-1000 pixels along the y axis, then the next sample window may be from 1200-2200 pixels along the y axis, and so on. By this way, each of the other sample windows has no overlapping with the image. The intervals could be pre-defined based on people's experience of the features of the defect of objects to be detected. Skipping some part of the image will not affect the result of defect detection substantially.

According to yet another embodiment under generating the sample windows through "pre-defined intervals", the next sample window may partly cover the previous sample window. For example, the pre-defined interval is set to be 200 pixels in the vertical direction (along y axis). If the original sample window is from 0-1000 pixels along the y axis, then the next sample window may be from 200-1200 pixels along the y axis, and so on. Persons skilled in the art shall understand that there could be various ways to generate the sample windows on the image depending on the computing resource and specific images of objects for analysis. The present invention does not exert any limitation on the specific way of generating sample windows. Persons skilled in the art will understand that the sample windows by "extension from the original window" have full coverage but may be slow in analyzing the image, while the sample windows by "intervals" do not have full coverage on the image but may be fast in analyzing the image.

According to an embodiment of the present invention, no matter whether the samples windows are generated through "extension from original sample window" or through "pre-defined intervals", the sample windows are extended or generated along a direction in vertical to the periodical direction of the image. For example in FIG. 2B, the periodical direction is along the horizontal direction (the x axis), which means the image appearance or pattern is repeated every certain length along the x axis. So the direction in vertical to the periodical direction in FIG. 2B is along the y axis.

The present invention does not set any limitation on how to determine the part of the image to be analyzed by sample windows, and does not set any limitation on whether and how to determine the intervals of sample windows.

The process 300 then moves to step 306. In step 306, one or more functions are generated from the part of the image that has been determined in the step 304. According to an embodiment of the present invention, each of the functions corresponding to a component of a pixel contained in the part of the image.

Persons skilled in the art should understand that a pixel in an image could contain various components. The RGB color model is an example. The RGB color model is additive color model in which red (R), green (G) and blue (B) lights are added together in various ways to reproduce a broad array of colors. The name of the model comes from the initials of the three additive primary colors, red, green and blue. Under RGB color model, each pixel's color could be represented by three components, namely R, G and B. Each pixel has its own values for each component of R, G and B respectively. To be more specific, for a pixel in pure white color, the values for R, G, B components are R (255), G (255) and B (255); for a pixel in pure black color, the values for R, G, B components are R (0), G (0) and B (0); for a pixel in pure green color, the values for R, G, B components are R (0), G (255) and B (255). It should be understood that the RGB color model is just an exemplary color model. There are various models to describe a color in addition to RGB color model, for example, the HSL (Hue, Saturation, Lightness) model and CMYK (Cyan, Magenta, Yellow, KeyPlate) model and etc. The present invention does not set any limitation on the specific color models. The present invention could be implemented or applied to any color model as long as different components can be extracted from an image pixel to generate one or more functions.

Now the RGB color model is still used for exemplary purpose to illustrate the step 306. According to an embodiment of the present invention, in order to generate the functions from the part of the image determined in the step 304, the various components of a pixel in that determined part of the image are extracted. That is to say, values of R (red), G (green) and B (blue) components of pixels contained in the determined part of the image are extracted. Persons skilled in the art should understand that there are tremendous existing methods or tools to extract values of RGB of a pixel, for example, Photoshop®, WriteableBitmap® and so on. The details of how to extract RGB values of a pixel will not be introduced here.

After the R, G and B components' values of pixels contained in the part of the image determined in step 304 have been extracted, functions are generated. Specifically under the RGB example, there may be three functions corresponding to the R, G and B components respectively. It could be understood that through the step 306, the image of objects is projected to functions based on the components contained in the image. In a general way to describe the generated functions in step 306, the functions are related to location information of pixels contained in the image and values of components corresponding to that location.

One axis of the function is along the periodical direction of the image, representing the location along the periodical direction of the image, and another axis of the function is the direction in vertical of the periodical direction of the image, representing the computed values of the component. It should be emphasized that in the present invention, the term "periodical direction" means a direction along which the image presents periodically. For example, if a pattern of the image repeats every certain length or pixels along the horizontal direction, like the FIG. 2B, we call horizontal direction the "periodical direction" in this invention. The "periodical direction" of the image is the same as the periodical direction of the functions. To simplify the description below, let's suppose the periodical direction is x axis, i.e., horizontal direction. There could be many alternatives for computing the value of component on the y axis for a certain point on the x axis to generate the functions. According to an embodiment of the present invention, an average value of the R, G, B components for all pixels within the determined part of the image along a direction in vertical to periodical direction of the image is computed. And the computed average value is set to be the value on the axis in vertical to the periodical direction in the corresponding functions. For example, it is supposed that the periodical direction is along the x axis and there are three pixels along the y axis for a certain point A on the x axis in the determined part of the image, and the three pixels' RGB values are Pixel 1: R (255), G (255), B (255); Pixel 2: R (200), G (200), B (200); Pixel 3: R (145), G (255), B (0), then the value related to R component for point A in the function corresponding to R component along the y axis is (255+200+145)/3=200 (R1). Similarly, the corresponding value of G for point A in the function corresponding to G component along the y axis is (255+200+255)/3=236.7 (G1) and the corresponding value of B for point A in the function corresponding to B component along the y axis is (255+200+0)/3=151.7 (B1). When we move to next certain point B on the x axis, the values for R, G, B can also be obtained in the similar way as R2, G2 and B2. Therefore, through this kind of computation, the values along the y axis for each point on the x axis (periodical direction) in the functions can be obtained so that the functions for R, G, B can be generated respectively. The function corresponding to R component may be represented as (X1, R1), (X2, R2), (X3, R3) . . . (Xn, Rn), and the function corresponding to G component may be represented as (X1, G1), (X2, G2), (X3, G3) . . . (Xn, Gn), and the function corresponding to B component may be represented as (X1, B1), (X2, B2), (X3, B3) . . . (Xn, Bn), wherein X1, X2, X3 . . . Xn representing the pixel location on the x axis and R1/G1/B1 . . . Rn/Gn/Bn representing the computed value of R, G, B component on the y axis in the functions corresponding to R, G, B components respectively. It can also be seen apparently from above description of the computation that as long as the original image has periodical pattern, each of the generated functions should also have the periodical pattern. Although in the original image the period may be a specific number like 10000 pixels along the x axis, the generated functions' period may be an abstract value instead of a value with specific physical meaning like the original image.

According to another embodiment of the present invention, a sum value of each of the R, G, B components for all pixels within the part of the image along a direction in vertical to periodical direction of the image is computed. And the computed sum value is set to be the value in the corresponding functions. For example of the specific pixels in above paragraph, the corresponding value of R for point A along the y axis will be 255+200+145=600. Similarly, the corresponding value of G for point A along the y axis is 255+200+255=710 and the corresponding value of B for point A along the y axis is 255+200+0=455.

It should be understood by persons skilled in the art that the computation of average values or sum values to generate functions are only provided for exemplary purpose, and the present invention does not limit any specific way to generate the value on the direction in vertical to the periodical direction in the functions as long as the computation method can maintain the periodical feature in the generated functions like the original image.

According to an embodiment of the present invention, functions are generated for all components of a pixel. For example, if RGB color model is used, there are three functions generated for R, G and B components respectively. According to another embodiment of the present invention, only some of the components are used to generate the functions. For example, if people know that the defect of objects are only or mainly reflected in certain components, we can only extract values for these relevant components and thus generate functions for such relevant components. This can help to reduce the computation burden and improve the speed.

After the one or more functions are generated from the part of the image in step 306, the process 300 now moves to the step 308. At step 308, self-similarity analytics is performed on the one or more functions to identify defect areas of the object. In mathematics, a self-similar object is exactly or approximately similar to a part of itself. The concept of self-similarity should be understood by persons skilled in the art and will not be introduced in detail here. Since the present invention is targeting to detect objects with repeated pattern and it can be known from above description that functions have been generated from the image with repeated pattern, the functions should have repeated pattern as well, which means the functions, like the original image, are periodical. Self-similarity is a significant feature of a periodical object or periodical curve graph because the graph for each period should be the same for a periodical curve graph. Therefore, the periodical feature of the functions may be used to implement the self-similarity analytics to identify defect areas of the object.

According to an embodiment of the present invention, in order to perform self-similarity analytics on the functions, the period of the functions shall be detected. According to an embodiment of the present invention, people may know the period of the to-be-detected objects so the detection of period information may be implemented by providing the known period information as a parameter directly for self-similarity analytics. For example, manufacturer of bearings knows that all the bearings should have period of 5 CM in appearance and such information may be directly provided to set the period of functions. According to another embodiment of the present invention, the period of functions is detected automatically on the functions. As the functions are represented as curve graphs corresponding to components of each pixel, period detection can be done on the curve graphs by moving the curve along the periodical direction of the objects or the functions. Specifically, for a perfect image without defect, move the series N pixels and compute the deviation between the raw series and the moved series, then the minimum deviation can be found showing the two series are aligned. Then the N is detected as the period length. Persons skilled in the art may adopt other solutions for automatic detection of the period length which is not beyond the scope of the present invention. It should also be emphasized that the period length of the functions may be different from the original image due to possible computation and mapping methods from the original image to the functions. However, persons skilled in the art should know how to identify the period length and make the self-similarity test based on the specific mapping relationship.

Once the period of functions is detected, self-similarity analytics is performed by moving each of the functions along the periodical direction to identify defect areas of the object. If the object has no defect, the functions should have accurate periodical features which means the curve graph representing the functions should be the same for each period. On the contrary, if the object has some defect, then the curve graph representing the functions should show the gap between the two periods where the curve graph should have been the same. In this way, the defect areas of the object may be identified.

It can be seen from above that using the process 300 illustrated in FIG. 3, there is no need to create any image template and there is thus no need to do any image comparison between the actual image of an object and the template image. The detection of defect of objects are done through generation of functions and self-similarity analytics automatically. Therefore, the speed of defect detection is improved and false alarm can be significantly reduced.

Figure 4A:
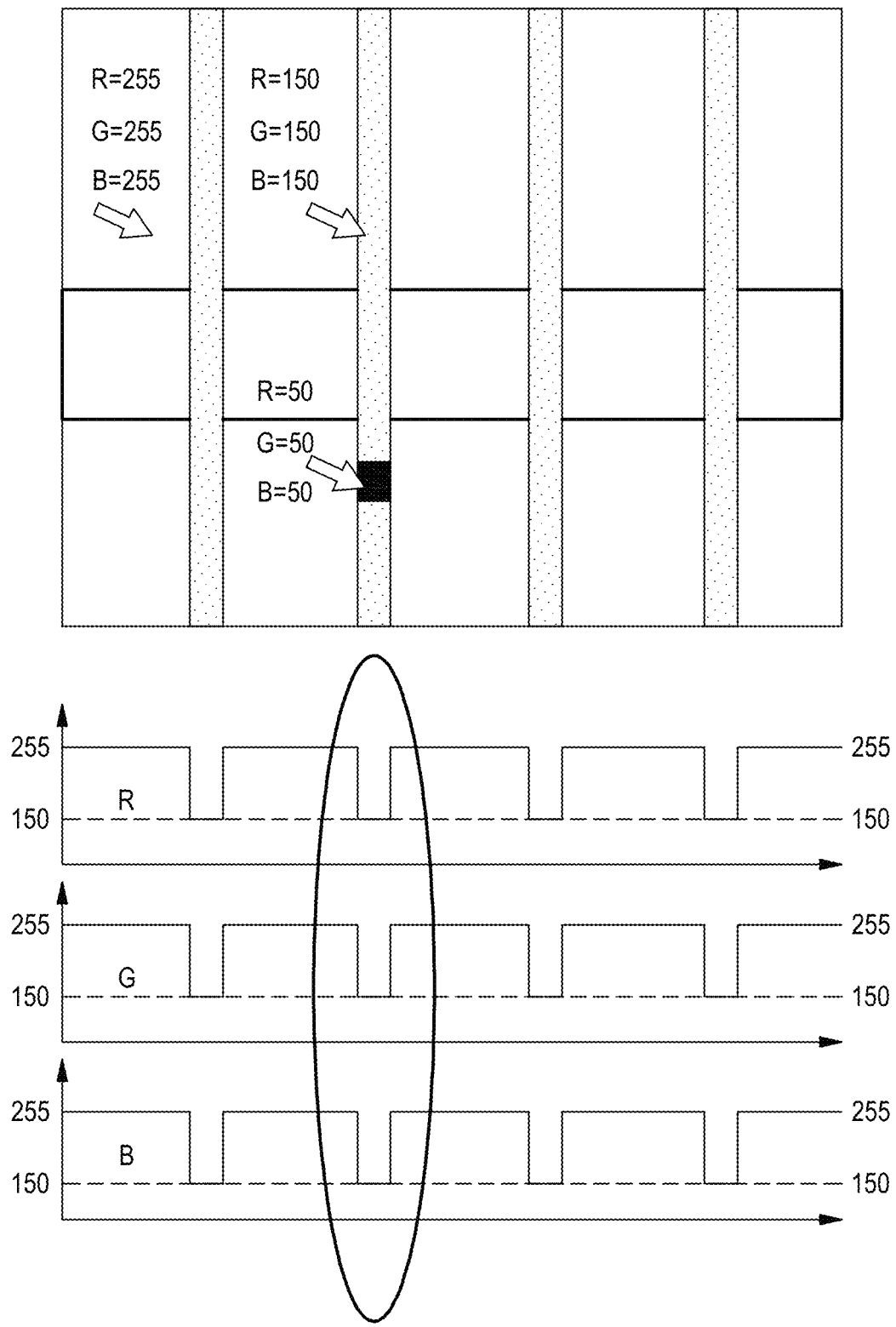
FIG. 4A to 4C show an exemplary sample to implement the method described in FIG. 3.
Figure 4B:
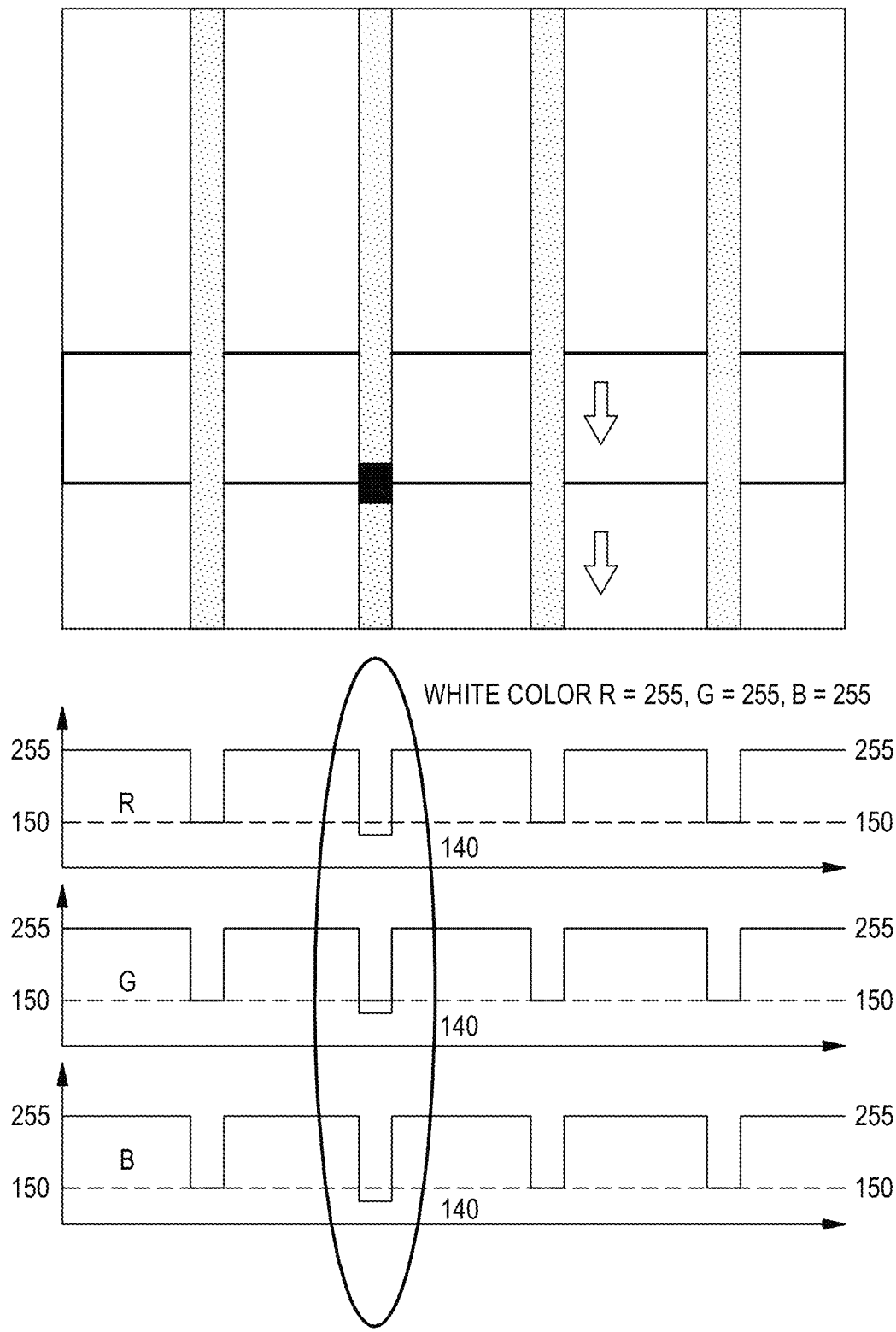
Figure 4C:
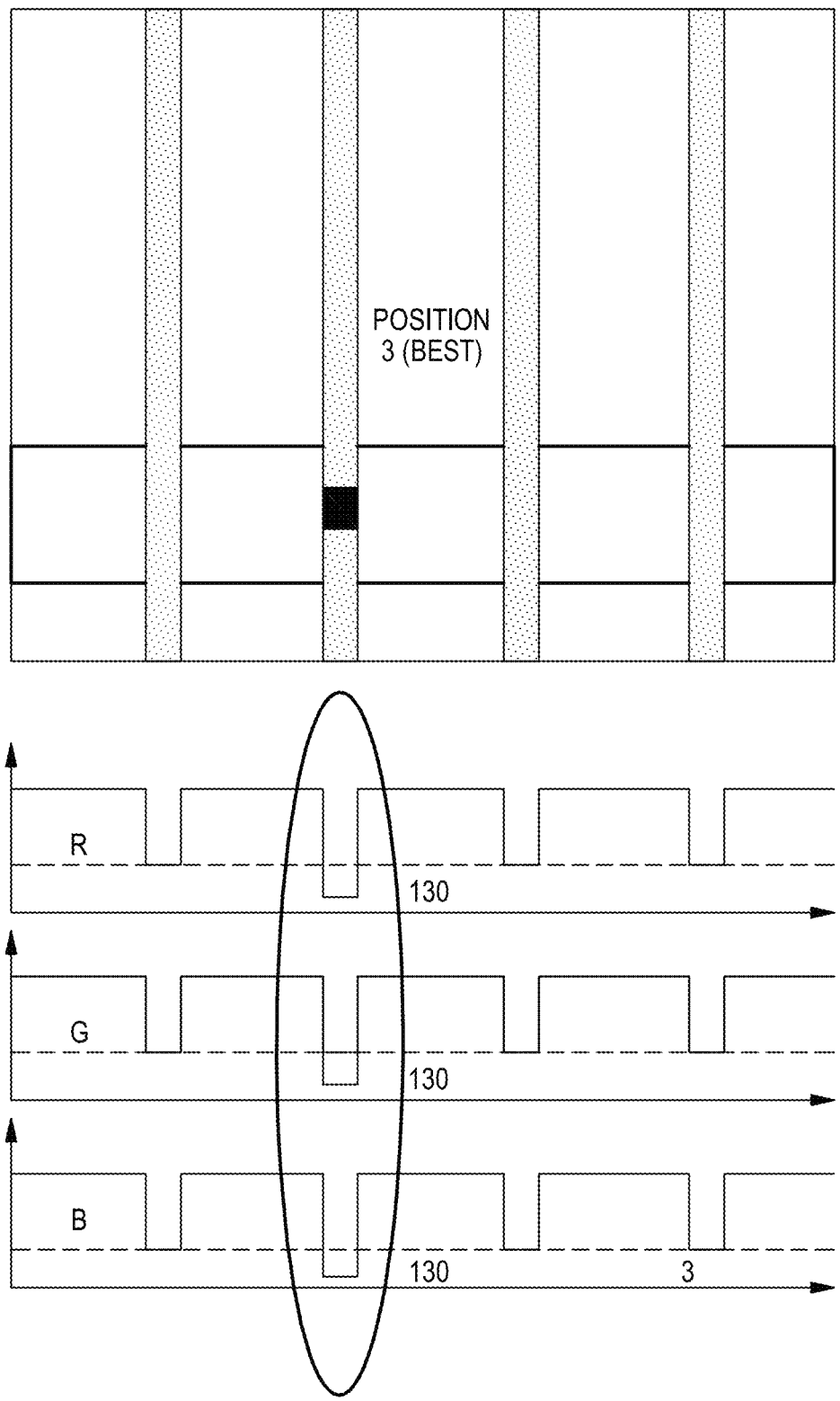

Now a specific example will be described below in reference to FIG. 4A-4C to better illustrate the process 300. FIG. 4A-4C show an image of an object with repeated pattern. It can be seen from FIG. 4A-4C that apparently the image of the object has periodical appearance along the horizontal direction. The repeated pattern includes background in white color and grey stripes in vertical direction. Also, it can be seen that there is a black dot on the image covering part of one grey stripe. The black dot is a defect that needs to be detected. And, FIGS. 4A-4C show three sample windows in line block confining different parts of the image for analysis, and the corresponding functions of R, G, B are shown right below the image with sample windows. R, G, B values for white color background is R (255), G (255), B (255), for grey stripes is R (150), G (150) and B (150), for black dot is R (50), G (50), B (50).

Now referring to FIG. 4A, the sample window (original sample window) does not cover any part of the defect area (black dot). Therefore, the functions of R, G and B corresponding to the part of the image confined by the sample window all strictly follow the periodical feature of the object's image. Specifically, in the area corresponding to the white color background, the value for R, G, B are all 255. In the area corresponding to the grey stripe, the values for R, G, B are all 150. As described in the above paragraphs, the values along the y axis in the functions of R, G and B are computed based on average value according an embodiment of the present invention. Now self-similarity analysis is performed based on the functions shown in FIG. 4A and no gap can be found out. So it is determined that there is no defect in the part of the image confined by the sample window in FIG. 4A.

Now referring to FIG. 4B, which shows the second sample window further generated from the original sample window in FIG. 4A based on pre-defined interval according an embodiment of the present invention. It can be seen from FIG. 4B that the second sample window shown in FIG. 4B does not completely cover the original sample window in FIG. 4A. And, part of the defect area (black dot) is falling within the sample window shown in FIG. 4B. Accordingly, in the functions shown in FIG. 4B, at the place corresponding to the defect area along the x axis, the R, G, B values are all 140, which is caused by half of the black dot within the sample window. Now self-similarity analysis is performed based on the functions shown in FIG. 4B and some gap can be found out. So it can be determined that there is some defect in the part of the image confined by the sample window in FIG. 4B.

Now further referring to FIG. 4C, which shows the third sample window further generated after the second sample window shown in FIG. 4B in the same pre-defined interval. It can be seen from FIG. 4C that the third sample window shown in FIG. 4C does not completely cover the second sample window in FIG. 4B as well. However, the whole defect area (black dot) is falling within the third sample window shown in FIG. 4C. Accordingly, in the functions shown in FIG. 4C, at the place corresponding to the defect area along the x axis, the R, G, B values are all 130, which is caused by the whole black dot within the third sample window. So it can be determined that there is some defect in the part of the image confined by the sample window in FIG. 4C. Now self-similarity analysis is performed based on the functions shown in FIG. 4C and bigger gap can be found out. And, it can be further determined based on the comparison between FIG. 4B and FIG. 4C that FIG. 4C best covers the defect area of the black dot if further functions based on next sample window shows smaller gap or none gap.

It should be understood that FIG. 4A to FIG. 4C is just to show an exemplary embodiment of the present invention. The given values and sample windows are only for illustrative purpose, without any limitation on the scope of the present invention. According to an embodiment of the present invention, considering that there could possibly noise during self-similarity analysis (though substantially reduced compared to image comparison using template images), a threshold could be set to identify the defect area. That is to say, if the gap is bigger than the threshold, then it is determined that defect area exists.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for object defect detection, comprising:
   receiving, by one or more processors, digital data representing an image of an object with a repeated pattern;
   identifying, by one or more processors, a part of the image of the object as defined by a sample window of the digital data, wherein the sample window of the digital data includes a portion of the repeated pattern;
   generating, by one or more processors, one or more functions from the part of the image, wherein each of the one or more functions corresponds to one component of a pixel contained in the part of the image in a single axis direction across the repeated pattern vertical to a periodical direction;
   performing, by one or more processors, self-similarity analytics on the one or more functions from the part of the image of the object to a plurality of functions from a plurality of parts of the image of the object as defined by a plurality of sample windows of the digital image; and
   responsive to determining the one or more functions exceeds a minimum deviation from the plurality of functions, identifying, by one or more processors, the part of the image of the object as a defect area of the object.

2. The method according to claim 1, wherein identifying a part of the image comprises:
   determining, by one or more processors, an original sample window of digital data confining a part of the image;

extending, by one or more processors, the original sample window to generate at least one other sample windows, wherein each of the other sample windows covering the original sample window; and determining, by one or more processors, the plurality of parts of the image, wherein each of the plurality of parts of the image being confined by the original sample window and each of the other sample windows respectively.

3. The method according to claim 1, wherein identifying a part of the image comprises:

determining, by one or more processors, an original sample window of digital data confining a part of the image;

generating, by one or more processors, at least one other sample window based on a pre-defined interval length, wherein each of the other sample windows partially covering the original sample window; and determining, by one or more processors, the plurality of parts of the image, wherein each of the plurality of parts of the image being confined by the original sample window and each of the other sample windows respectively.

4. The method according to claim 1, wherein the generated one or more functions are related to location information of pixels contained in the determined part of the image and values of components of the pixels.

5. The method according to claim 1, wherein generating one or more functions from the part of the image comprises:

extracting, by one or more processors, values of one or more components of pixels contained in the part of the image; and generating, by one or more processors, functions from the at least a part of the image based on the extracted values, wherein each of the functions corresponding to one of the components.

6. A computer program product comprising:

one or more computer readable storage media and program instructions stored on at least one of the one or more storage media, the program instructions comprising:

program instructions to receive digital data representing an image of an object with a repeated pattern;

program instructions to identify a part of the image of the object as defined by a sample window of the digital data, wherein the sample window of the digital data includes a portion of the repeated pattern;

program instructions to generate one or more functions from the part of the image, wherein each of the one or more functions corresponds to one component of a pixel contained in the part of the image in a single axis direction across the repeated pattern vertical to a periodical direction;

program instructions to perform self-similarity analytics on the one or more functions from the part of the image of the object to a plurality of functions from a plurality of parts of the image of the object as defined by a plurality of sample windows of the digital image; and program instructions to, responsive to determining the one or more functions exceeds a minimum deviation from the plurality of functions, identify the part of the image of the object as a defect area of the object.

7. The computer program product of claim 6, wherein program instructions to identify a part of the image comprises program instructions, stored on the one or more computer readable storage media, which when executed by a processor, cause the processor to:

determine an original sample window of digital data confining a part of the image;

extend the original sample window to generate at least one other sample windows, wherein each of the other sample windows covering the original sample window; and determine the plurality of parts of the image, wherein each of the plurality of parts of the image being confined by the original sample window and each of the other sample windows respectively.

8. The computer program product of claim 6, wherein program instructions to identify a part of the image comprises program instructions, stored on the one or more computer readable storage media, which when executed by a processor, cause the processor to:

determine an original sample window of digital data confining a part of the image;

generate at least one other sample window based on a pre-defined interval length, wherein each of the other sample windows partially covering the original sample window and determine the plurality of parts of the image, wherein each of the plurality of parts of the image being confined by the original sample window and each of the other sample windows respectively.

9. The computer program product of claim 6, wherein the generated one or more functions are related to location information of pixels contained in the determined part of the image and values of components of the pixels.

10. The computer program product of claim 6, wherein program instruction to generate one or more functions from the part of the image comprises program instructions, stored on the one or more computer readable storage media, which when executed by a processor, cause the processor to:

extract values of one or more components of pixels contained in the part of the image; and generate functions from the at least a part of the image based on the extracted values, wherein each of the functions corresponding to one of the components.

11. A computer system comprising:

one or more computer processors;

one or more computer readable storage media; and program instructions stored on the computer readable storage media for execution by at least one of the one or more computer processors, the program instructions comprising:

program instructions to receive digital data representing an image of an object with a repeated pattern;

program instructions to identify a part of the image of the object as defined by a sample window of the digital data, wherein the sample window of the digital data includes a portion of the repeated pattern;

program instructions to generate one or more functions from the part of the image, wherein each of the one or more functions corresponds to one component of a pixel contained in the part of the image in a single axis direction across the repeated pattern vertical to a periodical direction;

program instructions to perform self-similarity analytics on the one or more functions from the part of the image of the object to a plurality of functions from a plurality of parts of the image of the object as defined by a plurality of sample windows of the digital image; and program instructions to, responsive to determining the one or more functions exceeds a minimum deviation from the plurality of functions, identify the part of the image of the object as a defect area of the object.

12. The computer system of claim 11, wherein program instructions to identify a part of the image comprises program instructions, stored on the one or more computer readable storage media, which when executed by a processor, cause the processor to:

determine an original sample window of digital data confining a part of the image;
   extend the original sample window to generate at least one other sample windows, wherein each of the other sample windows covering the original sample window; and
   determine the plurality of parts of the image, wherein each of the plurality of parts of the image being confined by the original sample window and each of the other sample windows respectively.

13. The computer system of claim 11, wherein program instructions to identify a part of the image comprises program instructions, stored on the one or more computer readable storage media, which when executed by a processor, cause the processor to:

determine an original sample window of digital data confining a part of the image;
   generate at least one other sample window based on a pre-defined interval length, wherein each of the other sample windows partially covering the original sample window and
   determine the plurality of parts of the image, wherein each of the plurality of parts of the image being confined by the original sample window and each of the other sample windows respectively.

14. The computer system of claim 11, wherein program instruction to generate one or more functions from the part of the image comprises program instructions, stored on the one or more computer readable storage media, which when executed by a processor, cause the processor to:

extract values of one or more components of pixels contained in the part of the image; and
   generate functions from the at least a part of the image based on the extracted values, wherein each of the functions corresponding to one of the components.

\* \* \* \* \*